United States Patent
Shen et al.

(10) Patent No.: US 10,956,634 B2
(45) Date of Patent: Mar. 23, 2021

(54) METHOD FOR PREDICTING PLASTIC STRAIN RATIO FROM STAMPING SIMULATION

(71) Applicant: Ford Motor Company, Dearborn, MI (US)

(72) Inventors: Yinong Shen, Canton, MI (US); Feng Ren, West Bloomfield, MI (US); Yuan Gan, Livonia, MI (US); S. George Luckey, Jr., Dearborn, MI (US); Evangelos Liasi, Royal Oak, MI (US)

(73) Assignee: Ford Motor Company, Dearborn, MI (US)

( * ) Notice: Subject to any disclaimer, the term of this patent is extended or adjusted under 35 U.S.C. 154(b) by 497 days.

(21) Appl. No.: 15/871,779

(22) Filed: Jan. 15, 2018

(65) Prior Publication Data

US 2019/0220558 A1    Jul. 18, 2019

(51) Int. Cl.
| | |
|---|---|
| *G06F 30/23* | (2020.01) |
| *G06F 30/17* | (2020.01) |
| *G06F 111/10* | (2020.01) |
| *G06F 113/24* | (2020.01) |

(52) U.S. Cl.
CPC .............. *G06F 30/23* (2020.01); *G06F 30/17* (2020.01); *G06F 2111/10* (2020.01); *G06F 2113/24* (2020.01)

(58) Field of Classification Search
CPC ...... G06F 30/23; G06F 30/17; G06F 2113/24; G06F 2111/10
See application file for complete search history.

(56) References Cited

U.S. PATENT DOCUMENTS

| | | |
|---|---|---|
| 5,390,127 A | 2/1995 | Tang et al. |
| 6,205,366 B1 * | 3/2001 | Tang ............... B21D 22/20 700/127 |
| 7,870,792 B2 | 1/2011 | Kubli et al. |
| (Continued) | | |

OTHER PUBLICATIONS

Cui, Zhen, Z. Cedric Xia, Feng Ren, Vijitha Kiridena, and Lin Gao. "Modeling and validation of deformation process for incremental sheet forming." Journal of Manufacturing Processes 15, No. 2 (2013): 236-241. (Year: 2013).*

(Continued)

*Primary Examiner* — Rehana Perveen
*Assistant Examiner* — Chuen-Meei Gan
(74) *Attorney, Agent, or Firm* — Vincent Mastrogiacomo; Brooks Kushman, P.C.

(57) ABSTRACT

A method of evaluating a sheet metal stamping simulation is provided. The method may include defining elements of a finite-element mesh representing a stamped panel, operating on the elements to simulate deformation of the panel during stamping to generate, for each of the elements, incremental differential major and minor plastic strain values, applying a weighting factor to temporally adjacent pairs of the values to generate smoothed values, deriving, from the smoothed values and for each of the elements, a plurality of plastic strain incremental ratios representing plastic flow direction of the elements during the deformation, and altering colors of a map based on the ratios to represent changes in severity of plastic deformation of the stamped panel.

19 Claims, 11 Drawing Sheets

(56) References Cited

U.S. PATENT DOCUMENTS

| | | | | |
|---|---|---|---|---|
| 8,180,605 B1* | 5/2012 | Zhu | ............ | G06F 30/23 703/2 |
| 2008/0004850 A1* | 1/2008 | Wang | ............ | G06F 30/23 703/13 |
| 2011/0295570 A1* | 12/2011 | Zhu | ............ | G06F 30/23 703/2 |
| 2015/0039273 A1* | 2/2015 | Zhu | ............ | G06F 30/23 703/2 |
| 2015/0377806 A1* | 12/2015 | Minote | ............ | G06F 30/20 374/43 |

OTHER PUBLICATIONS

Wang, J. S., Z. Y. Jiang, A. K. Tieu, X. H. Liu, and G. D. Wang. "Adaptive calculation of deformation resistance model of online process control in tandem cold mill." Journal of Materials Processing Technology 162 (2005): 585-590. (Year: 2005).*

Xiong, Xin, Xiaodong Wang, Zhou Wan, and Jiande Wu. "Based on Exponential Smoothing Model of the mill self-learning optimization control." In Proceedings. The 2009 International Symposium on Computer Science and Computational Technology (ISCSCI 2009), p. 147. Academy Publisher, 2009. (Year: 2009).*

Brunet, Michel, Fabrice Morestin, and Hélène Walter-Leberre. "Failure analysis of anisotropic sheet-metals using a non-local plastic damage model." Journal of Materials Processing Technology 170, No. 1-2 (2005): 457-470. (Year: 2005).*

T.B. Stoughton, et al., "Path independent forming limits in strain and stress spaces," International Journal of Solids and Structures, 49 (2012), 3616-3625.

M. Weyer, "An Experimental and Theoretical Study on the Effect of Strain Rate on Ductile Damage," University of Cape Town, May 2016, 173 pages.

* cited by examiner

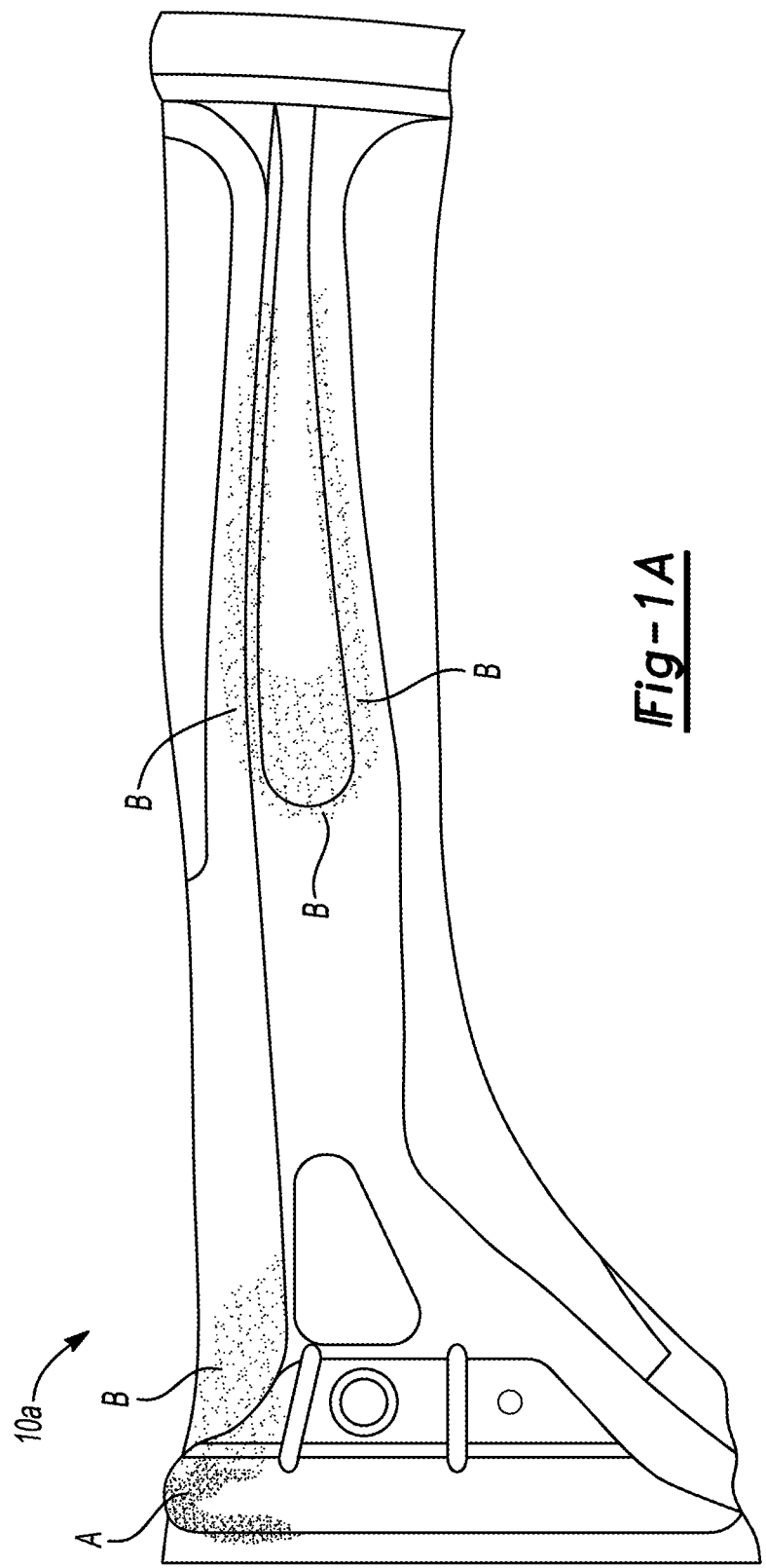

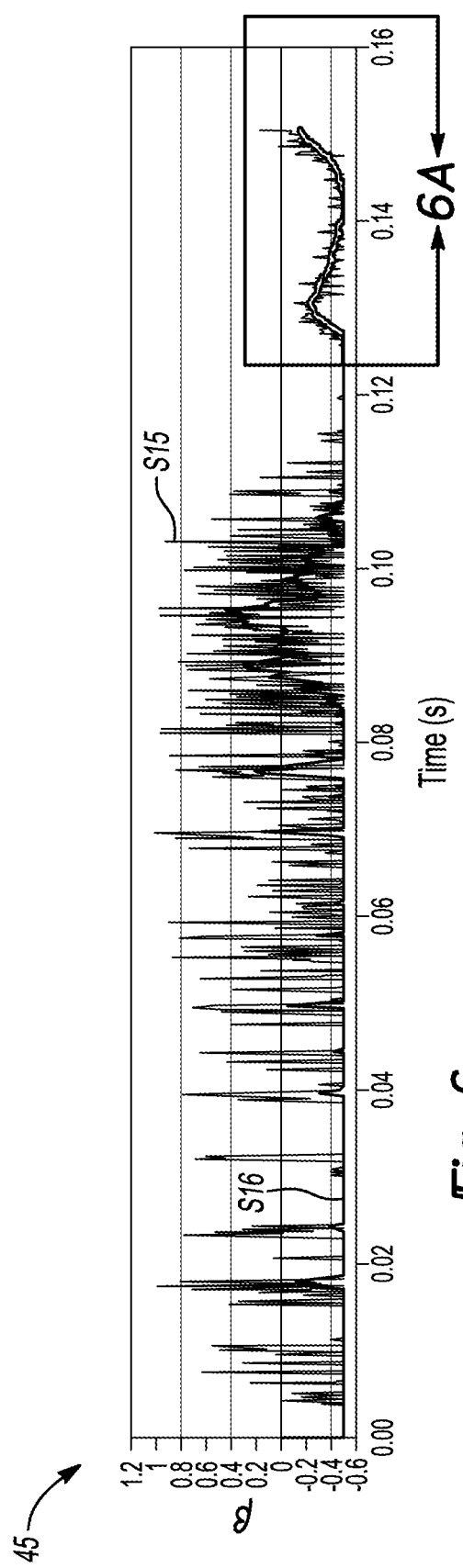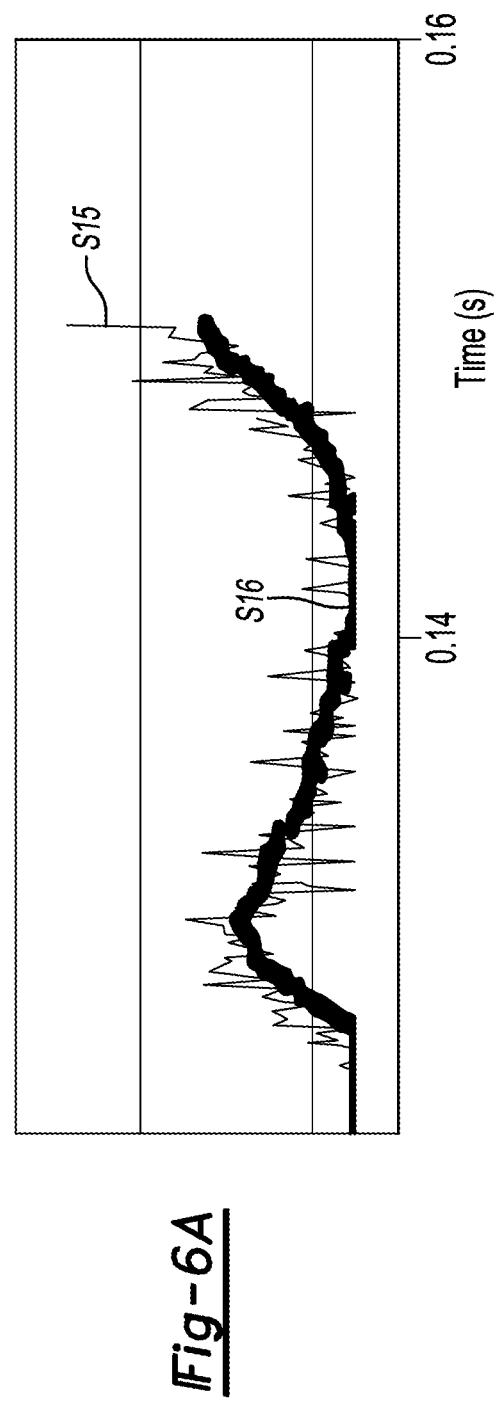

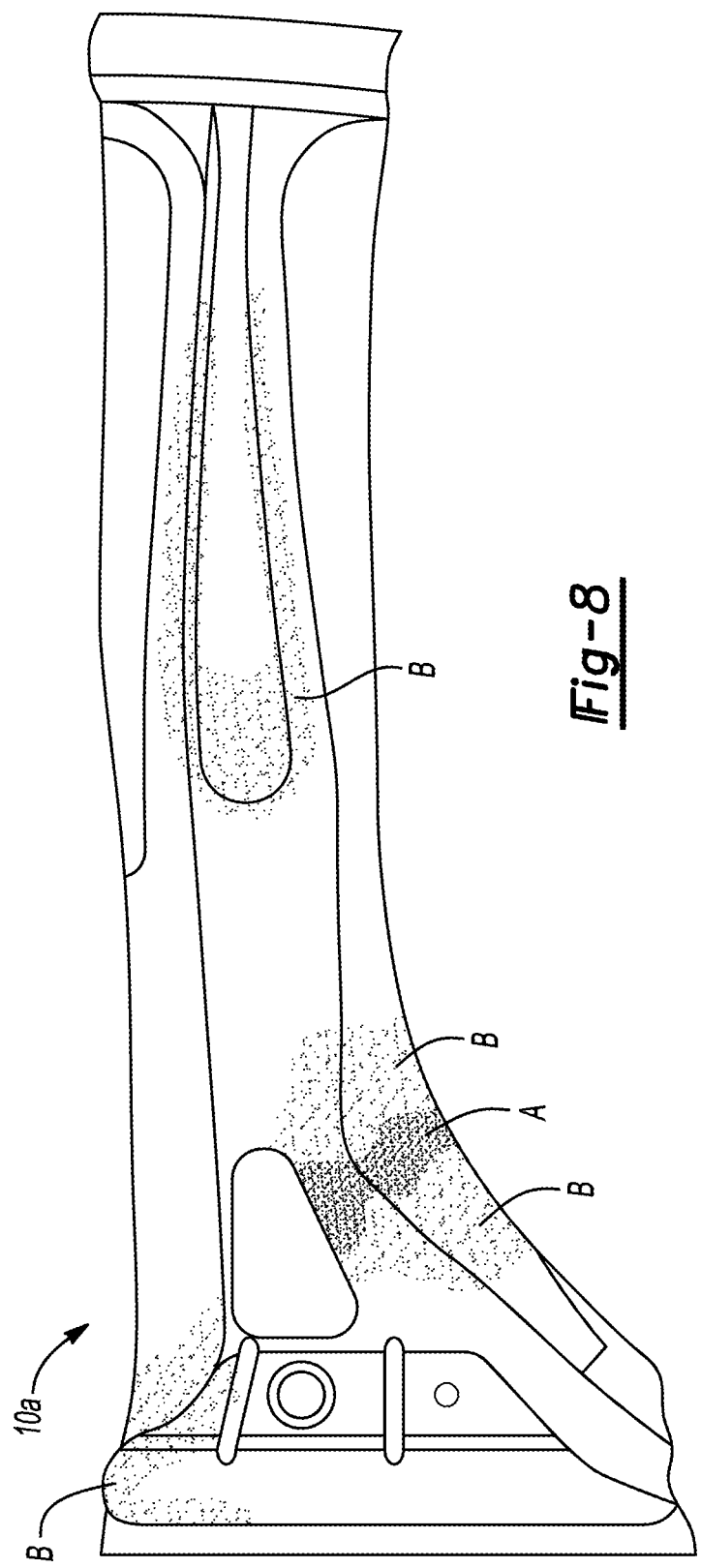

METHOD FOR PREDICTING PLASTIC STRAIN RATIO FROM STAMPING SIMULATION

TECHNICAL FIELD

This disclosure relates to assessing results of simulating a metal stamping process in an accurate and computationally efficient manner.

BACKGROUND

Sheet metal stamping is a process in which a sheet of metal (e.g. blank) is formed by deforming the material between a set of dies within a press. The stamping process is limited by buckling, wrinkling, tearing, and other phenomena that are detrimental to producing a quality part. Creating a set of dies capable of producing quality parts may require several design changes to the set of dies after multiple trials, the cost and time associated with developing the set of dies is significant.

Accurate computer simulation of the stamping process may eliminate all or a portion of the cost and time required to produce one or more finished sets of dies. Finite element analysis (FEA) is one method of simulating sheet metal forming operations to determine whether a proposed die design will produce quality part, free of tearing and minimize buckling, wrinkling, etc. FEA analysis begins by generating a mesh to divide the sheet metal part into hundreds of thousands of individual elements. In addition to dividing the parts into hundreds of thousands of elements, the simulation time is broken down into many time steps.

SUMMARY

According to one embodiment of this disclosure, a method of evaluating a sheet metal stamping simulation is provided. The method may include defining elements of a finite-element mesh representing a stamped panel, operating on the elements to simulate deformation of the panel during stamping to generate, for each of the elements, incremental differential major and minor plastic strain values, applying a weighting factor to temporally adjacent pairs of the values to generate smoothed values, deriving, from the smoothed values and for each of the elements, a plurality of plastic strain incremental ratios representing plastic flow direction of the elements during the deformation, and altering colors of a map based on the ratios to represent changes in severity of plastic deformation of the stamped panel.

According to another embodiment of this disclosure, a method of simulating a stamping is provided. The method may include generating incremental differential major and minor plastic strain values, for each element of a mesh, representing deformation of a stamped panel, weighting temporally adjacent pairs of the values to generate smoothed values, deriving from the smoothed values plastic strain incremental ratios representing plastic flow direction of the elements, and altering colors of a map based on the ratios to represent changes in plastic deformation of the stamped panel.

According to yet another embodiment of this disclosure, a method of evaluating a stamping simulation is provided. The method may include generating incremental differential major and minor plastic strain values, for each element of a mesh, representing deformation of a stamped panel, filtering the values to generate smoothed values, deriving from the smoothed values plastic strain incremental ratios representing plastic flow direction of the elements, and altering colors of a map based on the ratios to represent changes in plastic deformation of the stamped panel.

BRIEF DESCRIPTION OF THE DRAWINGS

FIG. 1A is an image of computer simulated stamping of an exemplary part.

FIG. 6 is graph of incremental strain plotted with respect to time before and after smoothing.

FIG. 6A is a detailed view of the taken along the lines 6A in FIG. 6.

FIG. 8 is an image of the computer simulated stamping after implementing one or more of the embodiments provided.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1B:
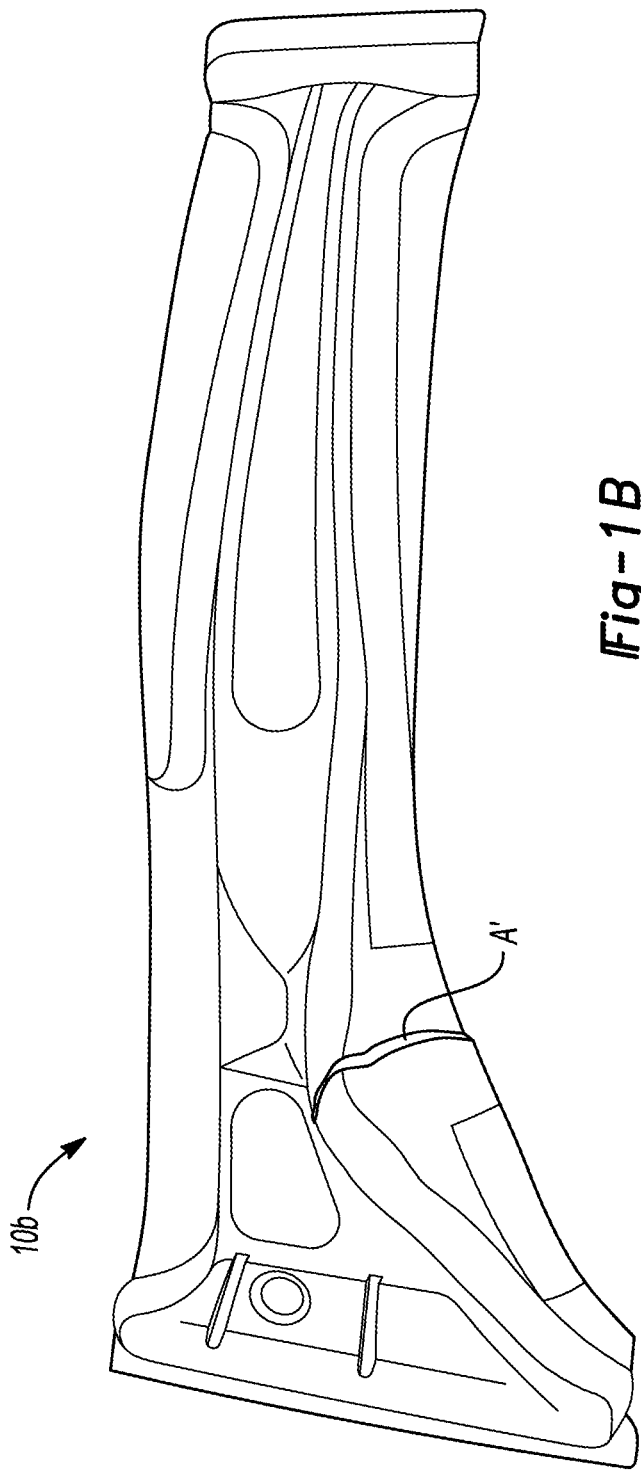
FIG. 1B is an illustration of a physically stamped part that corresponds to the simulated part shown in FIG. 1A.

Referring to FIGS. 1A and 1B, an image from computer generated stamping simulation of an example part 10a and an illustration of a corresponding stamped part 10b are shown. Portions of the part 10a are marked with two different zones A and B, to indicate the presence of strain that develop from stamping. The strain in zone A indicates that a crack may potentially form within that zone. Zone B indicates an amount of strain that is less than the amount of strain indicated in zone A. However, as evidenced in FIG. 1B, a crack or split A' developed in an unmarked area (e.g. lower strain area) on the stamped part 10b. The difference between the simulated stamping 10a and the physical stamping 10b indicates a poor correlation.

The absence of correlation between a stamping simulation and the physical stamping may lead to additional cost and expense. For example, if the simulation fails to predict a crack or other defect, additional changes to the stamping tools may be required. In contrast, if the simulation predicts a crack or other defect that does not manifest itself while physically stamping the part, unnecessary design changes to either the part, the tooling, or both may be made.

Figure 2A:
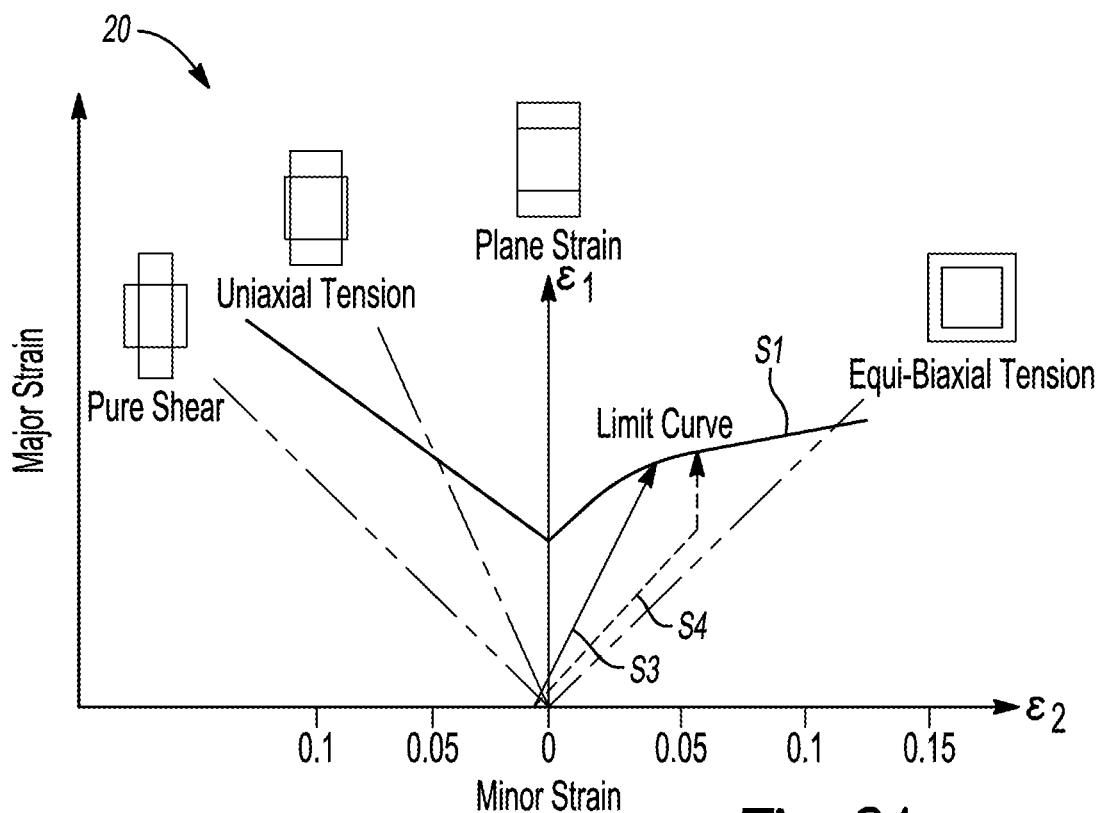
FIGS. 2A-2B illustrate a conventional forming-limit diagram and an equivalent-plastic-strain forming-limit diagram, respectively.
Figure 2B:
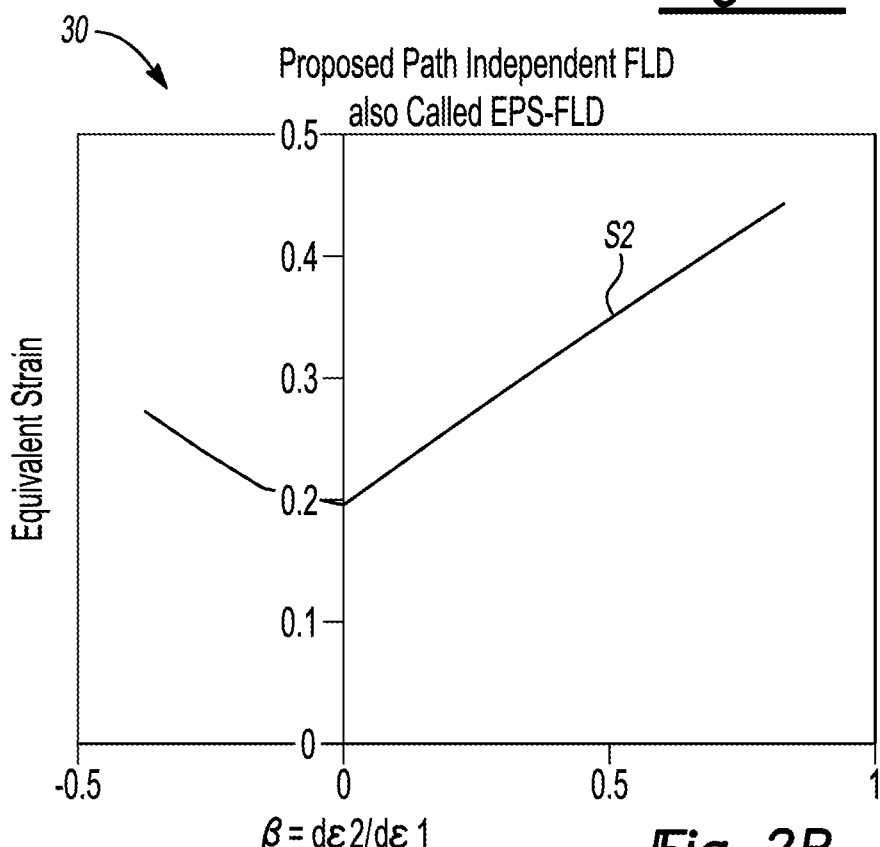

Referring to FIGS. 2A and 2B, a conventional forming-limit diagram (FLD) 20 and a path-independent FLD 30 are shown, respectively. The conventional FLD 20 in FIG. 2A includes a forming-limit curve (FLC) S1 plotted against major strain, represented on the vertical axis and minor strain, represented on the horizontal axis. To utilize the FLD, strains are plotted on the FLD. A strain state of an element represents the magnitude of strain at a specific location on the plot in different areas (e.g., shear, uniaxial tension, plane strain, and equi-biaxial tension). The area above the FLC S1 may be referred to as the failure zone and the area below the FLC S1 may be referred to as the safe zone. If the strain state is within the safe zone, below S1, it is likely that necking or fracturing will not occur. In contrast, if the strain path is within the failure zone, above S1, it is likely that necking or fracturing will occur.

The FLC may be generally constructed or developed through experiments involving applying linear strain paths to metal sheets until necking occurs. A strain path is a line on the FLD plot that depicts the progression of the strain state of an element. It is known that the FLC is only valid if a proportional strain path is present (e.g. line S3 represents a linear strain path). That means that the ratio of $\varepsilon 1$ and $\varepsilon 2$ is constant at every point in time. But in actual stamping and forming processes, non-proportional strain paths occur (e.g. line S4 represents non-linear strain path). Typically, stamped parts include complex geometries that involve successive stamping operations (e.g. drawing, flanging, hemming, etc.). These stamping operations require displacing the material in a direction followed by displacing the material in a different direction, within and across operations, making the strain paths away from linear in many areas of a part, as indicated by line S4.

To overcome these limitations, the use of path independent FLDs have been utilized. A path independent FLD is illustrated in FIG. 2B. The path independent FLD defines forming limit strain curve S2 based on equivalent plastic strain $\varepsilon^{eq}$ and the incremental plastic strain ratio $\beta$. The equivalent plastic strain $\varepsilon^{eq}$ is related to the size of the yield surface and the incremental plastic strain ratio $\beta$ is derived from the incremental change of the minor strain $d\varepsilon_2$ divided by the incremental change of the major strain $d\varepsilon_1$.

Figure 3:
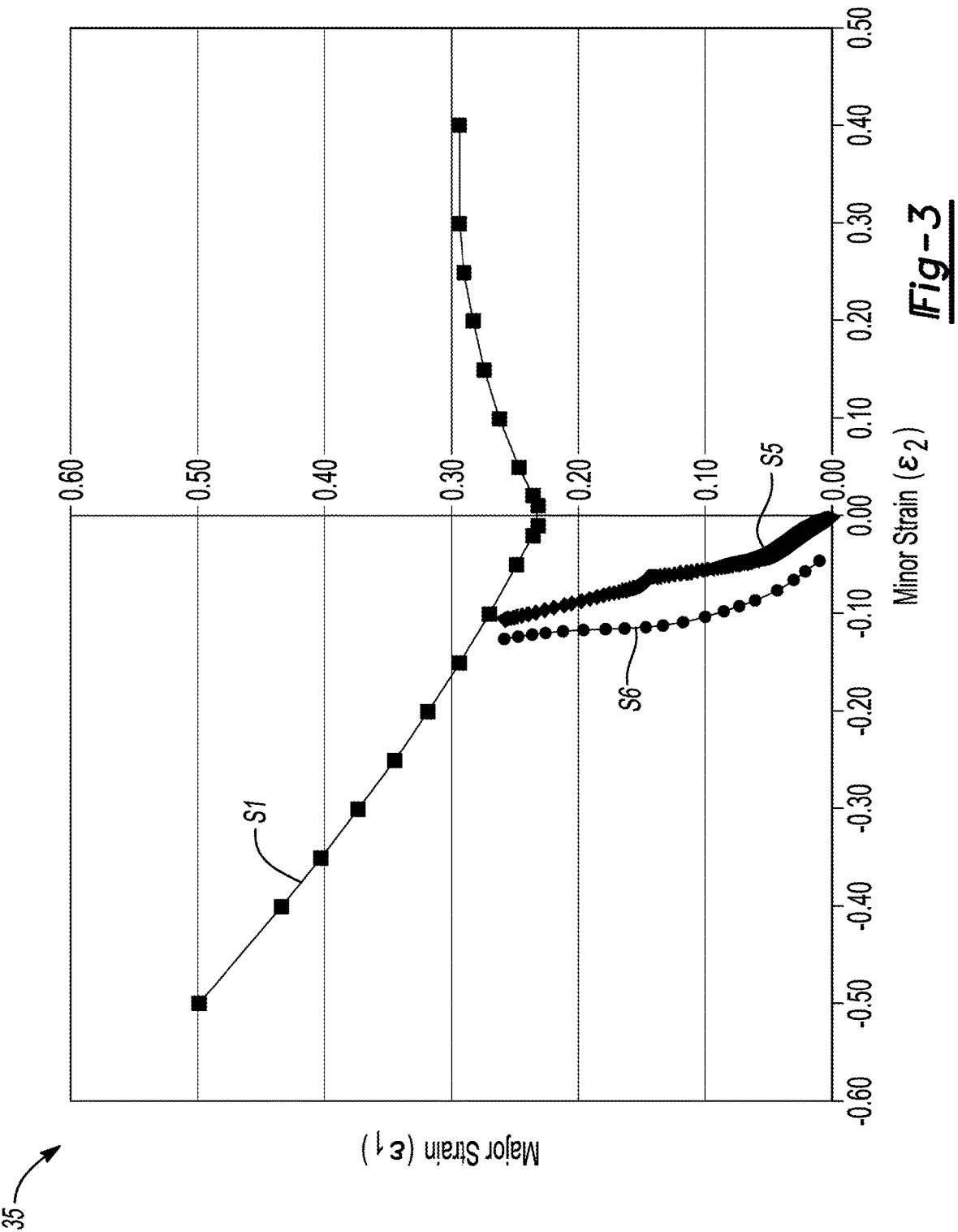
FIG. 3 is a graph of an exemplary conventional forming-limit diagram that includes simulated non-linear strain paths, S5 and S6.

Referring to FIG. 3, a graph of an exemplary conventional forming-limit diagram that includes simulated non-linear strain paths, S5 and S6 is provided. Major strain $\varepsilon 1$ is represented by the vertical axis and minor strain $\varepsilon 2$ is represented by the horizontal axis. Line S1 represents the path dependent FLC. Line S5 represents a first strain path or strain path 1 and line S6 represents a second strain path or strain path 2. To determine the path independent FLC, the incremental plastic strain ratio $\beta$ or $$\frac{d\varepsilon_2}{d\varepsilon_1}$$

must be determined. As will be described in greater detail below, limitations of computer simulations programs may prevent accurate and reliable computation of $\beta$.

Figure 4A:
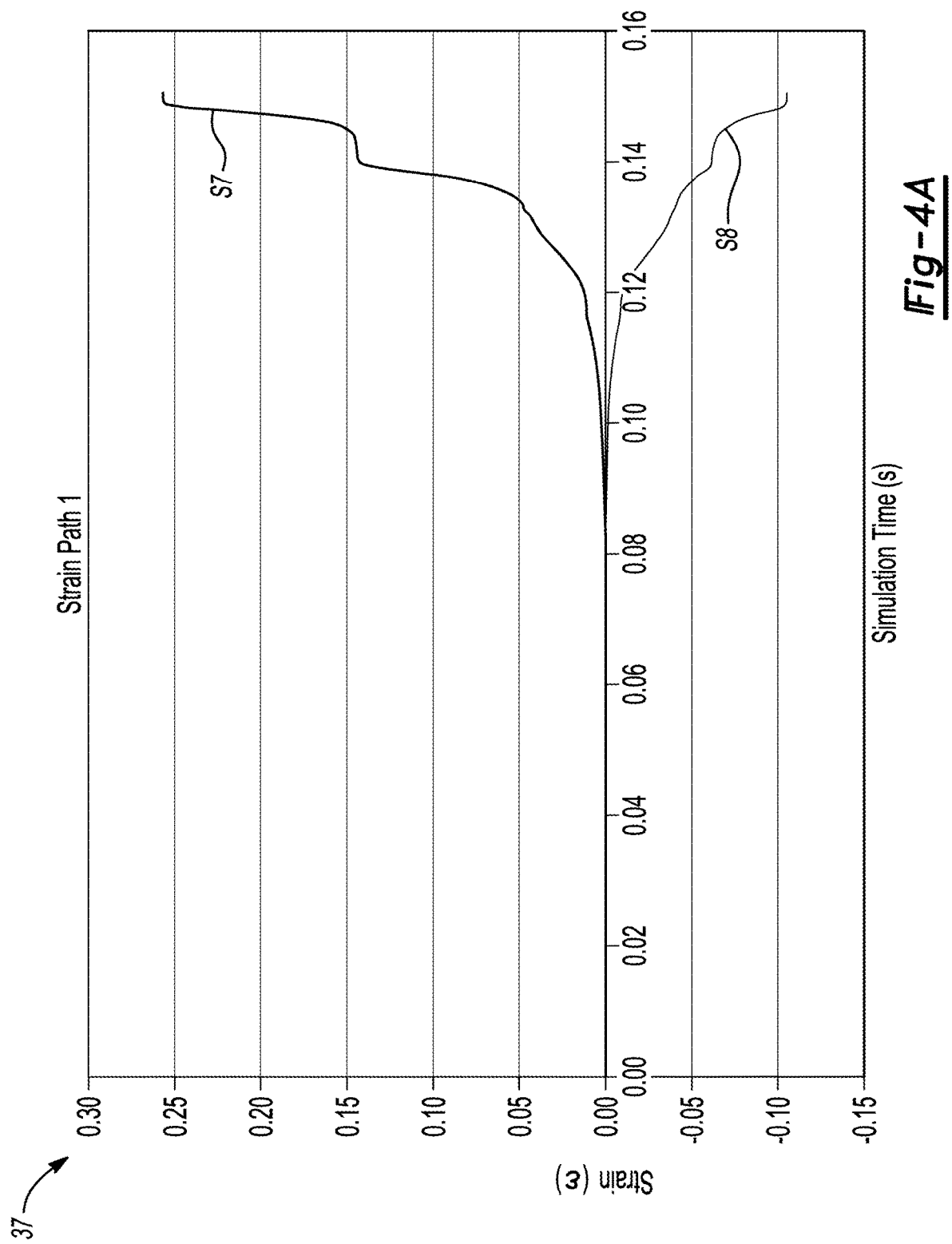
FIGS. 4A-4B are graphs depicting strain plotted with respect to for strain path S5 and the change in strain with respect to time for the same, respectively.
Figure 4B:
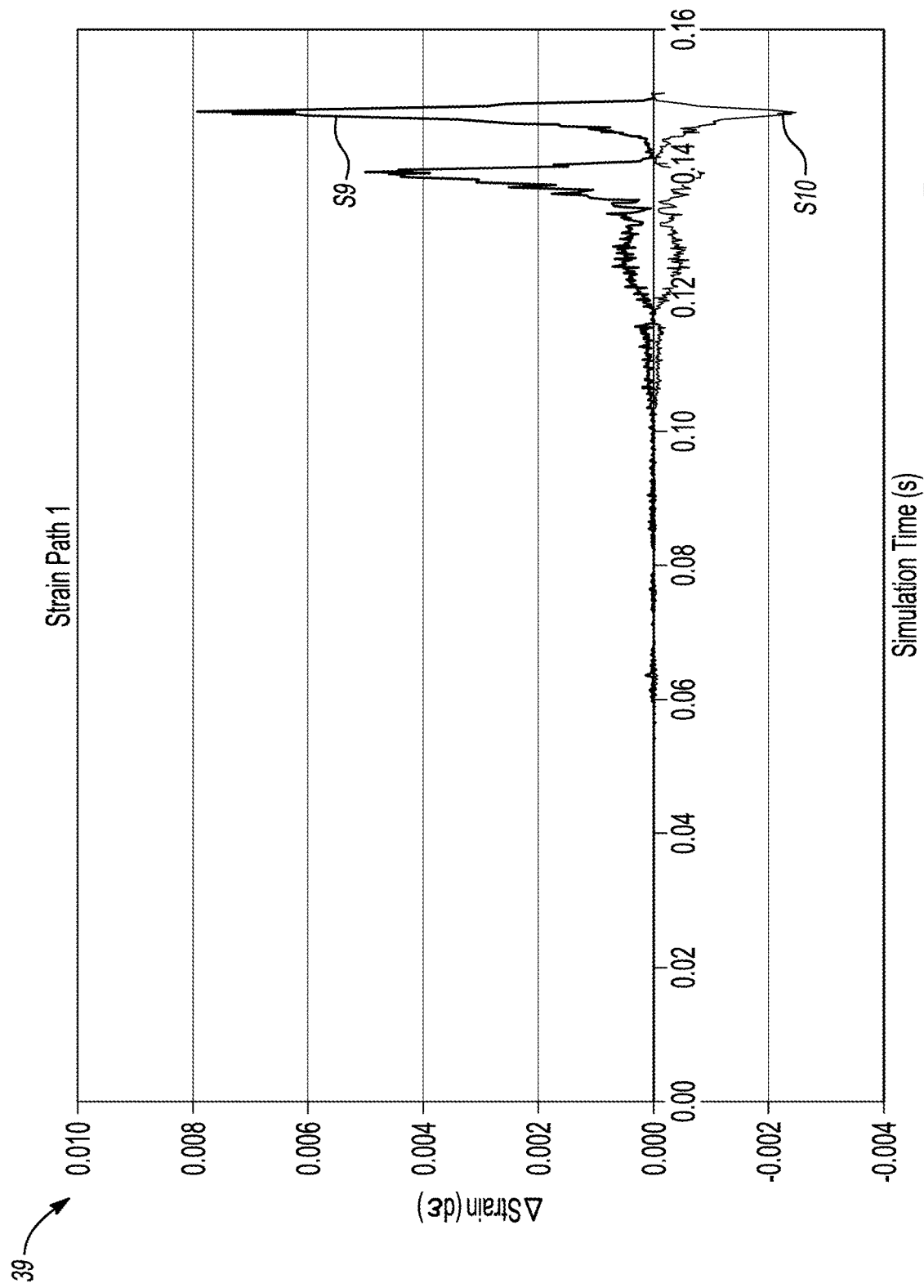

Referring to FIGS. 4A-4B, the major strain $\varepsilon 1$ represented by line S7 and minor strain $\varepsilon 2$ represented by line S8 of strain path 1 (previously shown in FIG. 3) are plotted with respect to simulation time (s). The strain c is represented by the vertical axis and the time (s) is represented by the horizontal axis. Referring specifically to FIG. 4A, the graph 37 includes the lines S7 and S8 that are relatively smooth and overlap one another between time 0.0 and 0.09 seconds. Line S7 peaks at a strain of approximately 0.26 at time 0.15 seconds. Whereas, line S8 extends in a negative direction of approximately 0.11 at 0.15 seconds. Referring specifically to FIG. 4B, the graph 39 depicts the stamping simulation results with incremental differential major strain $d\varepsilon_1$ of strain path 1 represented by line S9 and the incremental differential minor strain $d\varepsilon_2$, represented by line S10, are each plotted with respect to time (s). The incremental strain dε is represented by the vertical axis and the time (s) is represented by the horizontal axis. For reasons that will be explained in greater detail below, lines S9 and S10 include a significant amount of "noise." Noise is a term that refers to relatively useless or inaccurate data generated in the computer simulation.

Figure 5A:
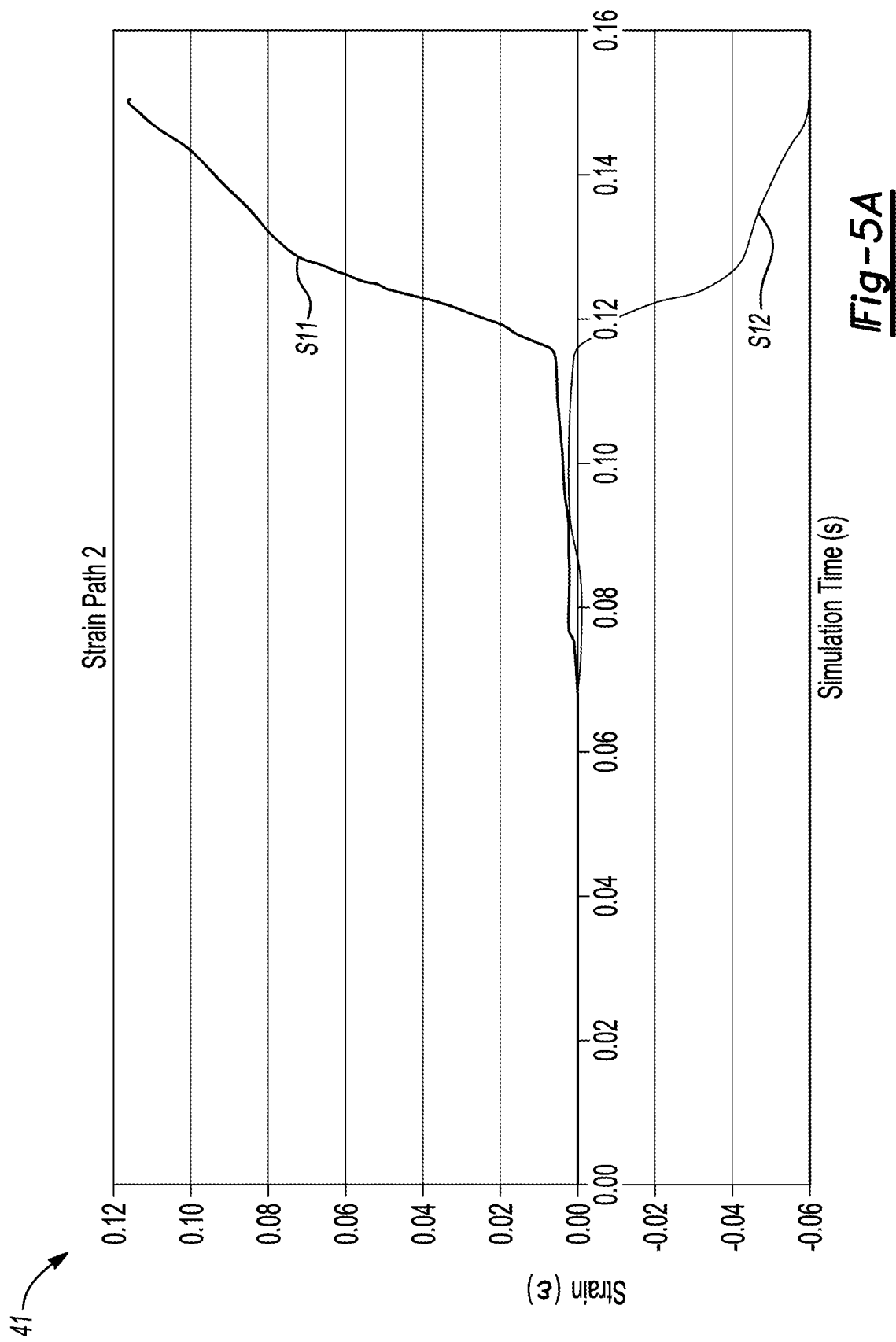
FIGS. 5A-5B are graphs depicting strain plotted for strain path S6 and the change in strain with respect to for the same, respectively.
Figure 5B:
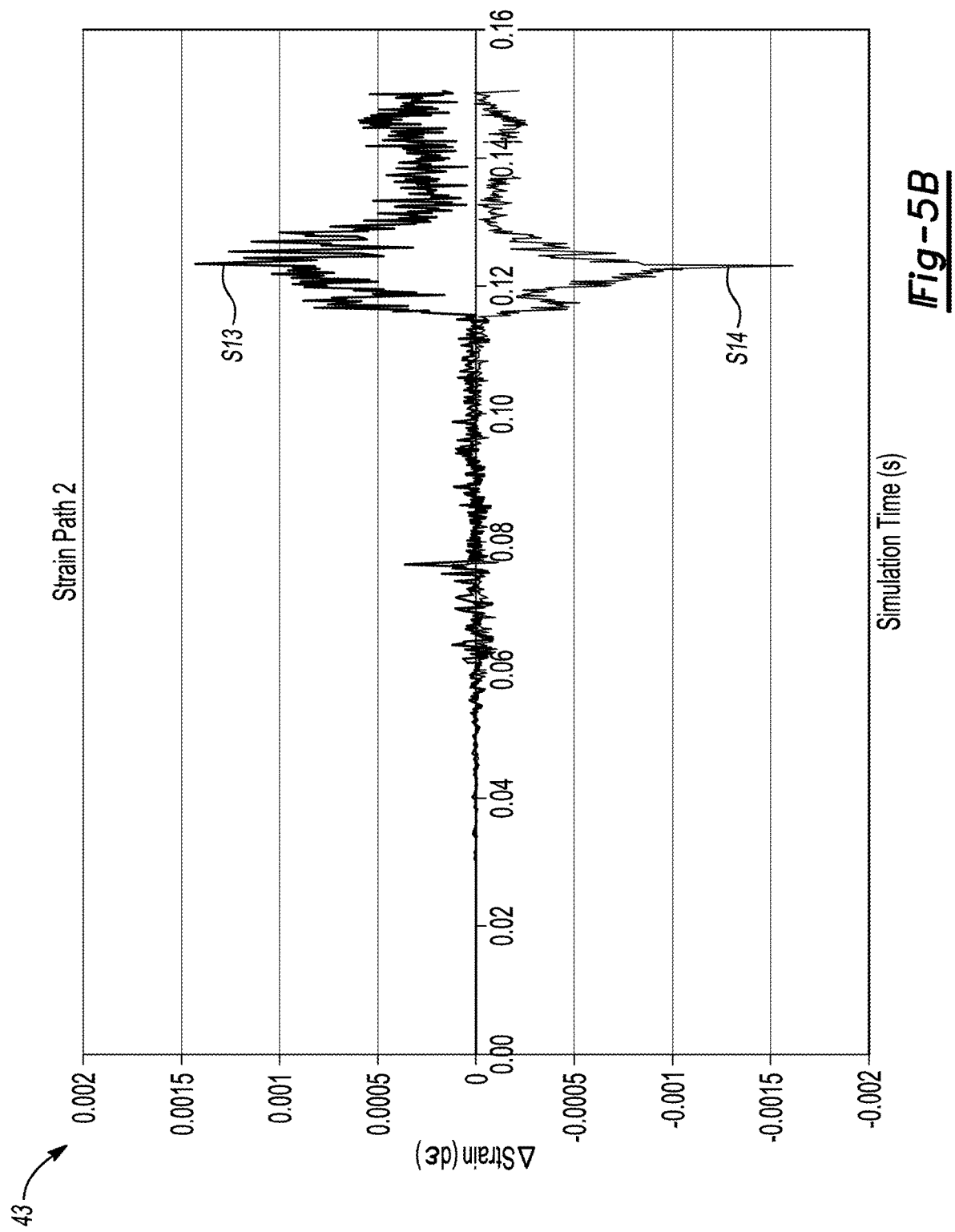

Referring to FIGS. 5A-5B, the major strain $\varepsilon 1$ represented by line S11 and minor strain $\varepsilon 2$ represented by line S12 of strain path 2 (previously shown in FIG. 3) are plotted with respect to time(s). The strain c is represented by the vertical axis and the time(s) is represented by the horizontal axis. Referring specifically to FIG. 5A, the graph 41 includes lines S11 and S12 are relatively smooth and overlap one another between time 0.0 and 0.07 seconds. Line S11 peaks at a strain of approximately 0.11 at time 0.15 seconds. Whereas, line S12 falls to a strain in a negative direction of approximately 0.06 at 0.15 seconds. Referring specifically to FIG. 5B, the graph 43 depicts the incremental differential major strain $d\varepsilon_1$ of strain path 2 represented by line S13 and the incremental differential minor strain $d\varepsilon_2$, represented by line S14, are each plotted with respect to time(s). The incremental strain dε is represented by the vertical axis and the time(s) is represented by the horizontal axis. Like the lines plotted in FIG. 4B, lines S13 and S14 include a significant amount of noise.

The erratic nature of the lines S9 and S10 in FIG. 4B and of the lines S13 and S14 in FIG. 5B stem from various factors. For example, the sampling rate or the time interval at which the strain is measured or recorded may increase the variation in the data. The sampling rate may be decreased to eliminate some or all of the noise within the data. But reducing the sampling rate may decrease the accuracy of the results and cause poor correlation between the simulation and a physical stamping. The sampling rate may be associated with a predicted deformation rate. For example, if a relatively high deformation rate is predicted for a stamping, the sampling rate may be increased. As another example, if the deformation rate is relatively low is predicted for a stamping, the sampling rate may be decreased. As another example, the variation or noise of the major and minor incremental strains dε may be caused by oscillation of the metal stamping. As previously mentioned, the metal blank, the upper die, and the lower die are each divided into hundreds of thousands of elements. As the metal blank is deformed, the elements of the upper die contact the metal blank and create vibratory oscillations throughout the metal blank. The issue of noisy data is further exacerbated when calculating $\beta$. As previously mentioned, the calculation to find $\beta$ is $$\frac{d\varepsilon_2}{d\varepsilon_1}.$$

Because the incremental differential major strain $d\varepsilon_1$ may be relatively small, the small deviation creates large variance in the data set. As one example, the incremental differential major strain $d\varepsilon_1$ may range between $\sim 10^{-9}$ to 0.008. As another example, the incremental minor strain $d\varepsilon_2$ may swing from positive value to negative value or other way around due to the "noise" of predicted strains.

Exponential smoothing is used to eliminate the noise of β plotted with respect to time. The equation used to exponentially smooth the data to derive a smoothed incremental differential major strain $d\varepsilon_1'$ and incremental differential minor strain $d\varepsilon_2'$ may be represented as:

$$d\varepsilon 1_{(n)}' = d\varepsilon 1_{(n-1)}' \times (1-\alpha) + d\varepsilon 1_{(n)} \times \alpha$$

$$d\varepsilon 2_{(n)}' = d\varepsilon 2_{(n-1)}' \times (1 \times \alpha) + d\varepsilon 2_{(n)} \times \alpha$$

Where: n is a specified value of time or point of measurement at a specified time. The equation includes deriving n based on a previous smoothed value or point in time (n–1) that is adjacent to n. The mathematical constant α is less than 1. The constant α may be chosen based on generating various graphs of the incremental strains to determine the optimal value. The greater or larger the value chosen for a is the greater amount of noise may still be present in the smoothed data set. On the other hand, choosing a smaller a may not capture certain types of deformation, such as delayed deformation, for example.

Referring to FIG. 6, a graph 45 of incremental strain plotted with respect to time before and after smoothing, is illustrated. The incremental strain β is represented by the vertical axis and the time is represented by the horizontal axis. Line S15 represents the incremental strain plotted with respect to time before exponential smoothing. Line S16 represents the incremental strain with respect to time after exponential smoothing. FIG. 6A is a detailed view of a portion of the graph taken along the lines 6A. The lines 6A surround an end portion of the graph that is often representative of the plastic deformation. This contrasts with the elastic deformation represented by the portion of the graph that precedes the end portion. Elastic deformation is a temporary shape change that is self-reversing after the force is removed, so that the object returns to its original shape. Whereas, plastic deformation is a permanent shape change that is not self-reversing even after removing the force. Determining a to smooth the end portion of the graph may be prioritized over the preceding portion because plastic deformation is required for necking and fracture.

Figure 7:
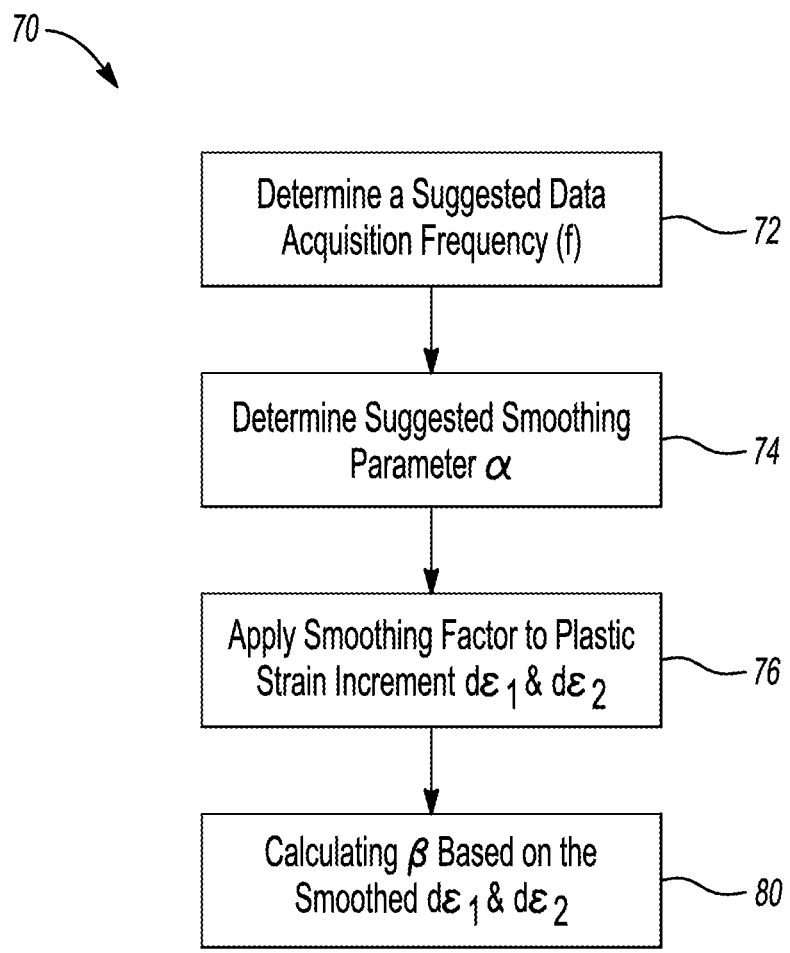
FIG. 7 is a flowchart depicting a process or method for the simulated stamping.

Referring to FIG. 7, a flowchart illustrating the operation of a system or method 70 of implementing the stamping simulation is depicted. The various functions or processes illustrated may be performed in a different order, may be omitted, or may be repeatedly performed although not explicitly illustrated or described to accomplish various features and advantages described herein as those of ordinary skill in the art will understand.

The method may begin by determining or selecting a suggested sampling rate or data acquisition frequency (f), as represented by operation 72. The sampling rate may be associated with a predicted deformation rate. For example, if a relatively high deformation rate is predicted for a stamping, the sampling rate may be increased. As another example, if the deformation rate is relatively low is predicted for a stamping, the sampling rate may be decreased.

The smoothing parameter a may then be determined, as represented by operation 74. As previously stated, α may be a predefined constant value between 0 and 1. Alternatively, α may be selected from a predetermined set of constant numbers that have been selected for specific stamping conditions. As yet another alternative, α may be defined based on a deformation rate of the metal sheet among other factors during the simulation process. In operation 76, the smoothing factor is applied to the incremental plastic strain values, as described above. The value of β may then be determined after deriving the smoothed incremental plastic strain ratios, as represented by operation 80.

Referring to FIG. 8, an image from computer generated stamping simulation of the example part 10a utilizing one or more embodiments provided in this disclosure, is illustrated. Like FIG. 1A described above, portions of the part 10a are marked with two different zones A and B, to indicate the presence of strain that develop from stamping. The portion of zone A that is sandwiched between two of the zone B sections is located in generally the same location as the crack A' in FIG. 1B.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of evaluating a sheet metal stamping simulation:
    defining elements of a finite-element mesh representing a stamped panel;
    operating on the elements to simulate deformation of the panel during a stamping simulation time to generate, for each of the elements, incremental differential major and minor plastic strain values;
    applying a smoothing factor to pairs of the incremental differential major and minor plastic strain values of the same element that occur at two adjacent points in time to generate smoothed incremental differential major and minor plastic strain values;
    deriving, from the smoothed incremental differential major and minor plastic strain values for each of the elements, a plurality of plastic strain incremental ratios representing plastic flow direction of the elements during the deformation time; and
    altering colors of a map based on the ratios to represent changes in severity of plastic deformation of the stamped panel.

2. The method of claim 1 further comprising:
    defining a sampling rate, based on the stamping simulation time, for recording the incremental differential major and minor plastic strain values.

3. The method of claim 2 wherein the sampling rate is associated with a predicted deformation rate of the panel during stamping.

4. The method of claim 3 wherein the applying occurs at a frequency coinciding with the defined sampling rate.

5. The method of claim 1 further comprising:
    generating a plurality of equivalent plastic strain values, representing yield surface size, for each of the elements, during the operating.

6. The method of claim 5 further comprising:
    plotting a line representing the plurality of equivalent plastic strain values with respect to the plurality of plastic strain incremental ratios; and
    comparing the line with a path-independent form limiting curve to determine the severity of plastic deformation of the stamped panel.

7. The method of claim 6 wherein each of the incremental differential major and minor plastic strain values are equal to a change in major strain and a change in minor strain between a first simulation time and a second simulation time.

8. The method of claim 7 wherein the plurality of plastic strain incremental ratios equals the incremental differential minor plastic strain divided by the incremental differential major plastic strain.

9. A method of simulating a stamping comprising:
generating incremental differential major and minor plastic strain values, for each element of a mesh, representing deformation of a stamped panel during a stamping simulation time;
smoothing pairs of the incremental differential major and minor plastic strain values of the same element that occur at two adjacent points in time to generate smoothed incremental differential major and minor plastic strain values;
deriving, from the smoothed values incremental differential major and minor plastic strain values for each of the elements, plastic strain incremental ratios representing plastic flow direction of the elements during a deformation time; and
altering colors of a map based on the plastic strain incremental ratios to represent changes in plastic deformation of the stamped panel.

10. The method of claim 9 further comprising:
defining a sampling rate, based on a simulation time, for recording the incremental differential major and minor plastic strain values.

11. The method of claim 10 wherein the sampling rate is associated with a predicted deformation rate of the panel during stamping.

12. The method of claim 9 wherein the smoothing pairs of the values includes defining a mathematical constant and applying the mathematical constant to the pairs of the values that occur at two adjacent points in time .

13. The method of claim 12 wherein the mathematical constant is greater than 0 and less than 1.

14. The method of claim 13 wherein the mathematical constant is associated with the plastic deformation of the stamped panel.

15. A method of evaluating a stamping simulation comprising:
generating incremental differential major and minor plastic strain values, for each element of a mesh, representing deformation of a stamped panel during a stamping simulation time;
smoothing pairs of the incremental differential major and minor plastic strain values of the same element that occur at two adjacent points in time by filtering the incremental differential major and minor plastic strain values to generate smoothed incremental differential major and minor plastic strain values;
deriving from the smoothed incremental differential major and minor plastic strain values for each of the elements, plastic strain incremental ratios representing plastic flow direction of the elements during the stamping simulation time; and
altering colors of a map based on the ratios to represent changes in plastic deformation of the stamped panel.

16. The method of claim 15 wherein smoothing pairs of the values includes defining a mathematical constant and applying the mathematical constant to the pairs of the values that occur at two adjacent points in time.

17. The method of claim 16 wherein the mathematical constant is greater than 0 and less than 1.

18. The method of claim 17 wherein the mathematical constant is user defined and is associated with the plastic deformation of the stamped panel.

19. The method of claim 15 further comprising:
defining a sampling rate, based on a simulation time, for recording the incremental differential major and minor plastic strain values.

* * * * *